(12) United States Patent
Peng et al.

(10) Patent No.: US 8,493,402 B2
(45) Date of Patent: Jul. 23, 2013

(54) SYSTEM, METHOD AND COMPUTER PROGRAM PRODUCT FOR COLOR PROCESSING OF POINT-OF-INTEREST COLOR

(75) Inventors: Ya-Ti Peng, Sunnyvale, CA (US); Yi-Jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 12/985,461

(22) Filed: Jan. 6, 2011

(65) Prior Publication Data

US 2012/0176395 A1 Jul. 12, 2012

(51) Int. Cl.
*G09G 5/02* (2006.01)

(52) U.S. Cl.
USPC ............ 345/589; 345/591; 345/593; 345/600

(58) Field of Classification Search
USPC ......................................................... 345/589
See application file for complete search history.

(56) References Cited

U.S. PATENT DOCUMENTS

| | | | | |
|---|---|---|---|---|
| 5,448,379 A | * | 9/1995 | Ishihara et al. | 358/518 |
| 5,504,821 A | * | 4/1996 | Kanamori et al. | 382/167 |
| 6,504,551 B1 | * | 1/2003 | Takashima et al. | 345/649 |
| 6,847,373 B1 | * | 1/2005 | Gonsalves et al. | 345/589 |
| 7,358,976 B2 | * | 4/2008 | Hampshire et al. | 345/589 |
| 7,609,908 B2 | * | 10/2009 | Luo et al. | 382/274 |
| 2008/0111896 A1 | * | 5/2008 | Yoshino et al. | 348/223.1 |
| 2008/0152225 A1 | * | 6/2008 | Iwamoto | 382/190 |
| 2009/0315912 A1 | * | 12/2009 | Lien et al. | 345/604 |
| 2012/0019550 A1 | * | 1/2012 | Pettigrew et al. | 345/594 |

FOREIGN PATENT DOCUMENTS

| | | |
|---|---|---|
| JP | 2009-152760 A | 7/2009 |
| JP | 2009152760 A * | 7/2009 |
| WO | 2012/094201 A2 | 7/2012 |

OTHER PUBLICATIONS

"HQV Benchmark," Standard Definition (SD) HQV Benchmark Version 2.0, Retrieved on Apr. 7, 2011, 2 pages, Webpage available at: http://www.hqv.com/index.cfm?page=benchmark.

International Search Report and Written Opinion received for Patent Application No. PCT/US2011/067493, mailed on Aug. 30, 2012, 9 pages.

* cited by examiner

*Primary Examiner* — James A Thompson
*Assistant Examiner* — Jason Pringle-Parker
(74) *Attorney, Agent, or Firm* — Garrett IP, LLC

(57) ABSTRACT

Methods and systems to manipulate color processing parameters to allow the detection of an arbitrary color of interest. Such reconfigurations may enable general point-of-interest color processing. Color mapping curves may also be configured, to accomplish the tasks of color correction, enhancement, de-saturation, and color compression.

21 Claims, 14 Drawing Sheets

SYSTEM, METHOD AND COMPUTER PROGRAM PRODUCT FOR COLOR PROCESSING OF POINT-OF-INTEREST COLOR

BACKGROUND

The processing of point-of-interest color has been a pervasive problem in graphics processing. This problem often arises in the processing of skin tone colors, where off-hue skin tones need to be corrected while maintaining a hue shift for non-skin tone colors. In addition to correction, the enhancement of a color of interest is also a common problem.

Existing technology attempts to determine the possibility of a pixel being a skin color pixel, and to enhance the color intensity of the pixel according to its likelihood of being a skin color. This process of saturation enhancement, however, cannot necessarily correct a certain color when it is off-hue. The skin tone correction test that is often used is not generally extendable to an arbitrary color.

BRIEF DESCRIPTION OF THE DRAWINGS/FIGURES

DETAILED DESCRIPTION

An embodiment is now described with reference to the figures, where like reference numbers indicate identical or functionally similar elements. Also in the figures, the leftmost digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

In the system described herein, color processing parameters may be manipulated to allow the detection of an arbitrary color of interest. Such reconfigurations may enable general point-of-interest color processing. Color mapping curves may also be configured, to accomplish the tasks of color correction, enhancement, de-saturation, and color compression.

Figure 1:
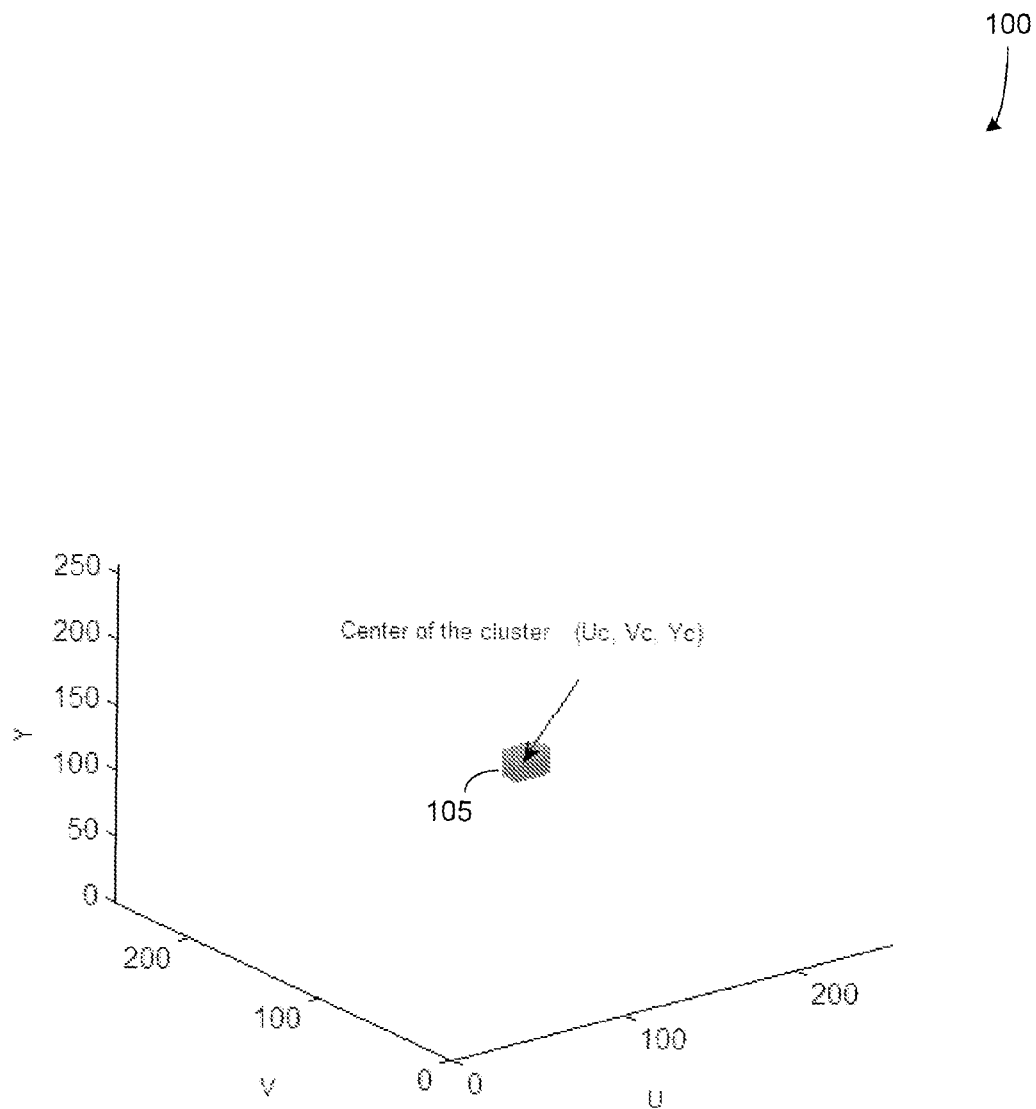
FIG. 1 illustrates a color cluster in a three-dimensional (3D) YUV space, where a color of interest may be located at the center of the cluster.

FIG. 1 shows a cluster of colors in a three-dimensional (3D) YUV domain where the center of the cluster may be considered as the point-of-interest color. The specification of such a 3D cluster may be accomplished by taking the intersection of its projections onto the three planes (i.e., UV, YV and YU).

Figure 2:
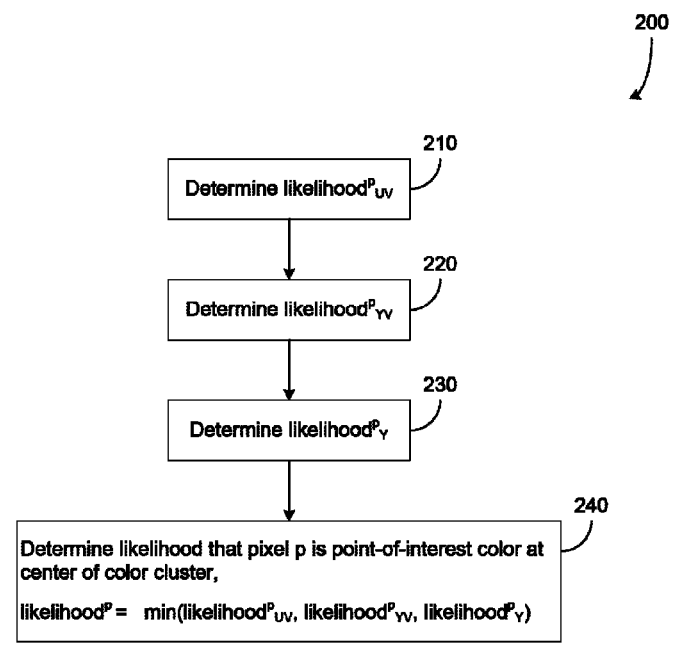
FIG. 2 is a flowchart illustrating the process of determining the likelihood that the color of a pixel is found at the center of a color cluster, according to an embodiment.

The process of detecting a point-of-interest color is illustrated in FIG. 2, according to an embodiment. At 210, the likelihood that an input pixel p is the point-of-interest color in the UV plane $(U_c, V_c)$ may be determined. This probability is shown as likelihood$^p{}_{UV}$. At 220, the likelihood that an input pixel p is the point-of-interest color $(Y_c, V_c)$ in the YV plane may be determined. This probability is shown as likelihood$^p{}_{YV}$. At 230, the likelihood that an input pixel p is the point-of-interest color $(Y_c, U_c)$ in the YU plane may be determined. This latter probability may simplified to be a one-dimensional projection over the Y-axis in the illustrated embodiment, as will be described below. This probability is shown as likelihood$^p{}_Y$. At 240, the likelihood that the pixel p is the point-of-interest color at the center of the color cluster may be determined. This probability is shown as likelihood$^p$.

The generation of these likelihoods may be described as follows. While the distribution of a point-of-interest color can result in an arbitrary projection shape on the UV plane, a rectangle and a diamond shape in a transformed coordinate plane, i.e., hue-saturation (HS) plane, may be utilized to approximate the shape of the projection to facilitate the detection of the projection in UV plane:

$$\begin{bmatrix} S \\ H \end{bmatrix} = \begin{bmatrix} \cos\theta_c & -\sin\theta_c \\ \sin\theta_c & \cos\theta_c \end{bmatrix} \begin{bmatrix} U - U_c \\ V - V_c \end{bmatrix}. \qquad (1)$$

$(U_c, V_c)$ and $\theta_c$ in the above equation represent the projection of the 3D distribution center c (i.e., the point-of-interest color) on the UV plane and the orientation angle of this projection. As shown in eq. 1, the values U and V may be shifted initially by $U_c$ and $V_c$ respectively. The processing of eq. 1 may create S and H coordinates that correspond to the input coordinates (U, V), where the projection may be rotated by the angle $\theta_c$. The likelihood of a pixel being a point-of-interest color pixel in the UV plane may decrease with the distance from $(U_c, V_c)$:

$$\text{likelihood}^p_{UV} = \min(R_{factor}, D_{factor}), \quad (2)$$

$$R_{factor} = \quad (3)$$
$$\begin{cases} \min[(H_{max} - |H_p|)/2^{|B_{margin}-5|}, \\ \quad (S_{max} - |S_p|)/2^{|B_{margin}-5|}], & \text{for all } |H_p| < H_{max} \,\&\, |S_p| < S_{max}, \\ 0, & \text{otherwise} \end{cases}$$

$$D_{factor} =$$
$$\begin{cases} 1, & \text{for all dist} < (D_L - D_{margin}) \\ (D_L - D_{margin})/2^{|B_{D\_margin}-5|}, & \text{for all } (D_L - D_{margin}) \le \text{dist} < D_L, \\ 0, & \text{otherwise} \end{cases}$$

$$\text{dist} = [|S_p - dS| + (1/\tan\beta)|H_p - d_H|] \quad (4)$$

Figure 3:
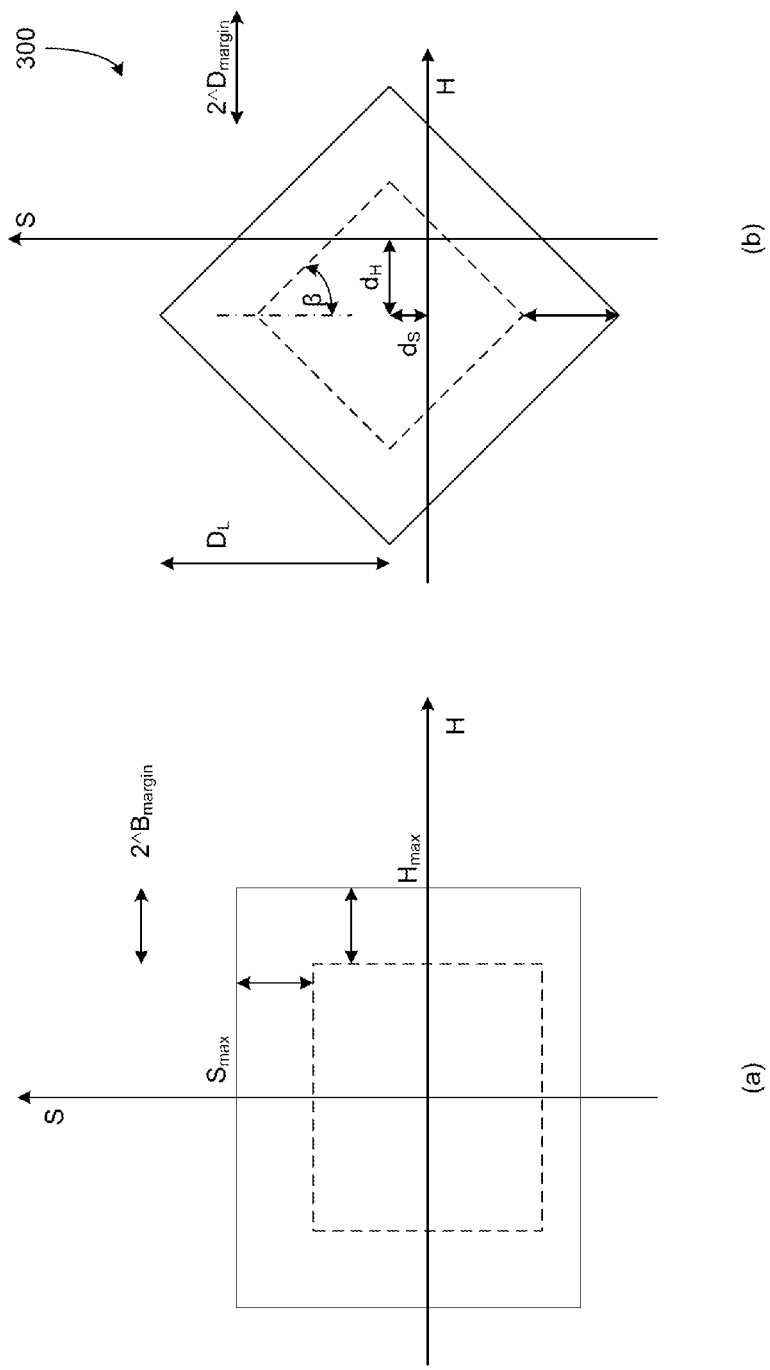
FIG. 3 illustrates rectangular and diamond-shaped projections of a color cluster on a hue-saturation (HS) plane, according to an embodiment.

$R_{factor}$ and $D_{factor}$ in eq. 2-4 represent the soft decision, or likelihood, of an input pixel p being the point-of-interest color $(U_c, V_c)$ determined from the rectangle and diamond-shaped projections respectively. $(H_p, S_p)$ in eq. 3 and 4 is the input pixel p in the HS plane, while $H_{max}, S_{max}, B_{margin}$) and $D_L$, $D_{margin}, B_{D\_margin}, d_H, d_S$ and $\beta$ are parameters specifying the range of the rectangle and diamond shapes as shown in FIG. 3.

Figure 4:
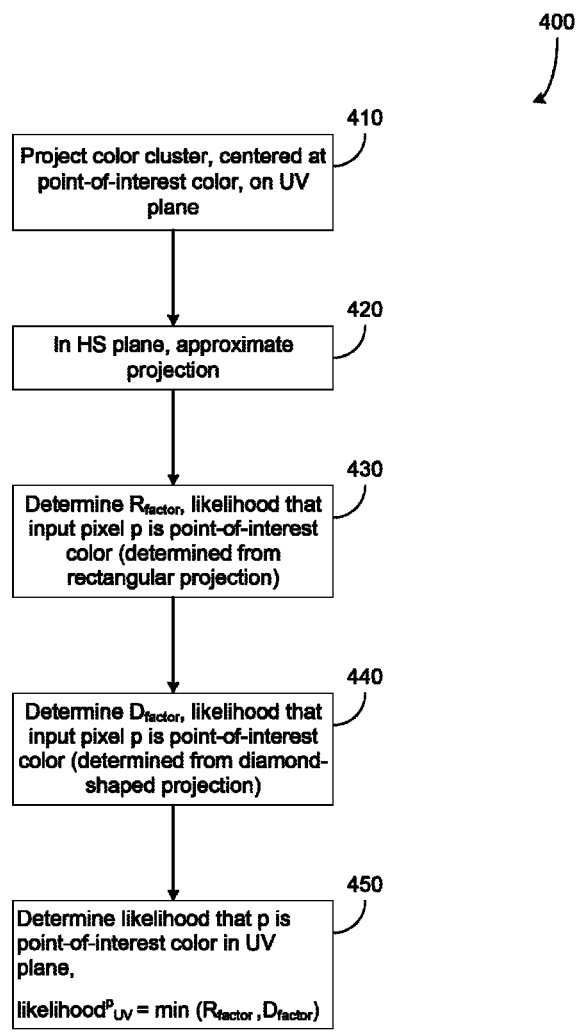
FIG. 4 is a flowchart illustrating the process of determining the likelihood that the color of a pixel is a point-of-interest color in the UV plane, according to an embodiment.

The process for determining likelihood that p is the color of interest in the UV plane is illustrated in FIG. 4, according to an embodiment. At 410, the color cluster, centered at the point-of-interest color, may be projected on the UV plane. At 420, this projection may be approximated in the HS plane. At 430, the likelihood that the pixel p is the point-of-interest color may be determined from the rectangular shaped projection, as described in eq. 3 above. This probability is shown as $R_{factor}$. At 440, the likelihood that the pixel p is the point-of-interest color may be determined from the diamond-shaped projection, as described in eq. 4 above. This probability is shown as $D_{factor}$. At 450, the likelihood that the pixel p is the point-of-interest color in the UV plane may be determined, $\text{likelihood}^p_{UV} = \min(R_{factor}, D_{factor})$.

The same method of utilizing a rectangle in conjunction with a diamond shape to represent the projection of a 3D color cluster on a 2D plane may be applied to the soft decision in the YV and YU planes. Nevertheless, accurate modeling of the projection on the UV plane may contribute to the detection of a point-of-interest color more than the projections on the YV and YU planes. This leads to the simplification of the detection process on the YV and YU planes: the projection in the YV plane may be approximated by the use of two piecewise linear functions (PWLFs) while the projection in the YU planes may be further simplified to be a one-dimensional projection over the Y axis.

The likelihood in the YV plane may then be calculated as $$\text{likelihood}^p_{YV} = \min(det_L, det_U) \quad (5)$$

where $$det_L = \begin{cases} 1, & \text{for all } V_p > [f_L(Y_p) + M_{VY\_L}] \\ [V_P - f_L(Y_p)]/M_{VY\_L}, & \text{for all } f_L(Y_p) \le V_P \le [f_L(Y_p) + M_{VY\_L}], \\ 0, & \text{otherwise} \end{cases} \quad (6)$$

and $$det_U = \quad (7)$$
$$\begin{cases} 1, & \text{for all } V_p < [f_U(Y_p) - M_{VY\_U}] \\ [f_U(Y_p) - V_p]/M_{VY\_U}, & \text{for all } [f_U(Y_p) - M_{VY\_U}] \le V_p \le f_U(Y_p) \\ 0, & \text{otherwise} \end{cases}$$

Figure 5:
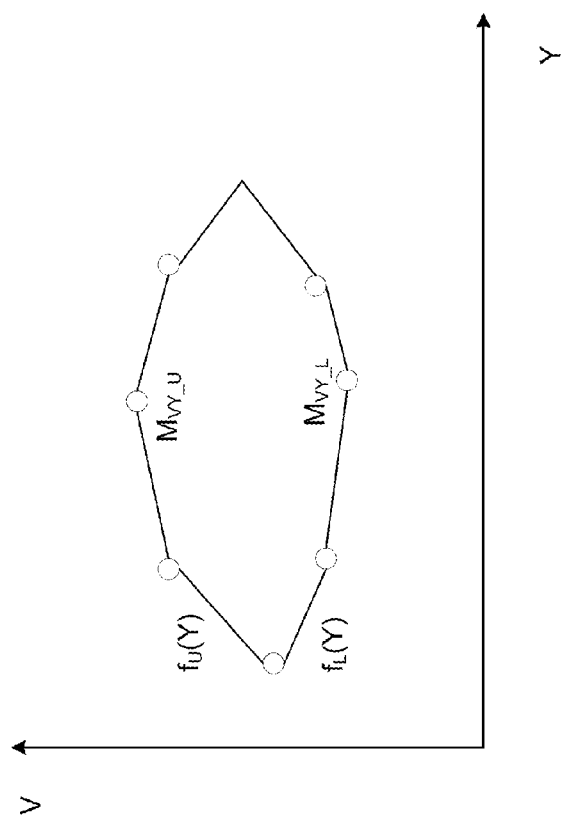
FIG. 5 illustrates two piece-wise linear functions (PWLFs) that may be used to approximate the projection of a color cluster on the YV plane, according to an embodiment.

Here, $Y_p$ and $V_p$ represent the Y and V values of the input pixel p respectively: $M_{YV\_U}$ and $M_{YV\_L}$ are parameters that specify the confidence margins in the YV plane. $f_L$ and $f_U$ are the two PWLFs mapping Y to V, and each of them may be composed of four anchor points as shown in FIG. 5.

Figure 6:
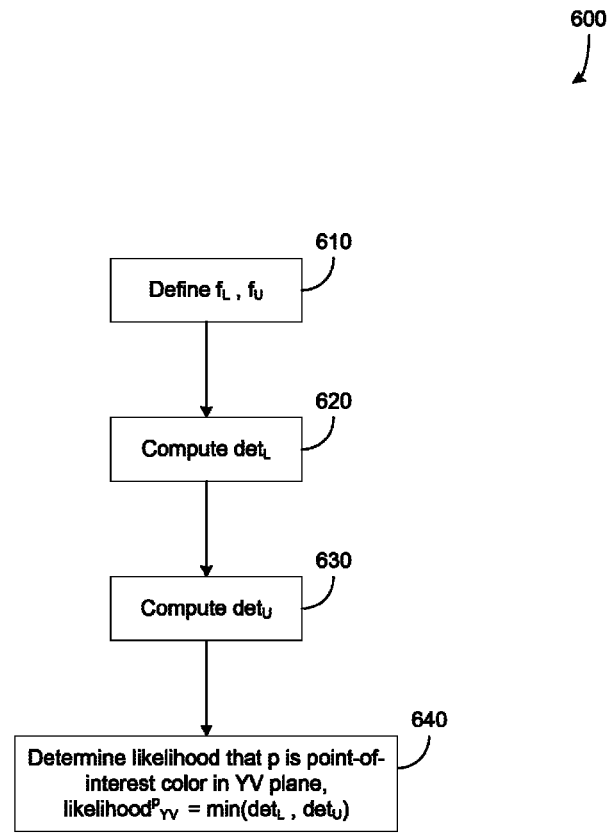
FIG. 6 is a flowchart illustrating the process of determining the likelihood that the color of a pixel is a point-of-interest color in the YV plane, according to an embodiment.

The process for determining likelihood in the YV plane is illustrated in FIG. 6, according to an embodiment. At 610, the functions $f_L$, and $f_U$ may be defined. At 620, the value $det_L$ may be computed according to eq. 6 above; at 630, the value $det_U$ may be computed according to eq. 7 above. At 640, the likelihood that the pixel p is the point-of-interest color in the YV plane may be determined, $\text{likelihood}^p_{YV} = \min(det_L, det_U)$.

Figure 7:
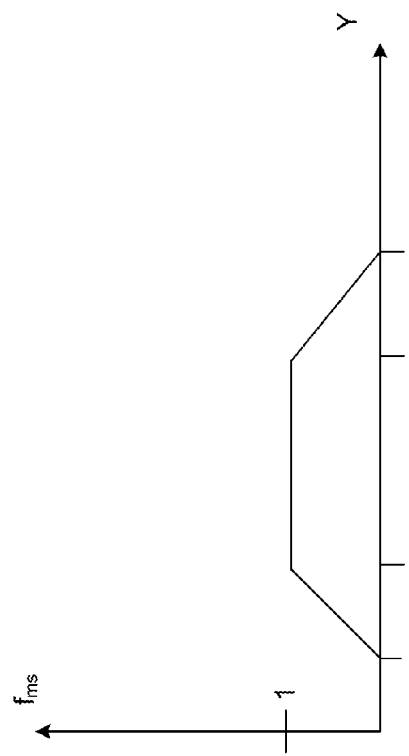
FIG. 7 illustrates a PWLF that may be used to approximate the projection of a color cluster on the YU plane, according to an embodiment.

The likelihood over the 1D Y axis may be given by a PWLF, $$\text{likelihood}^p_Y = f_{ms}(Y_p) \quad (8)$$

where $f_{ms}$: Y→ms, and ms∈[0,1]. The PWLF $f_{ms}$ may be controlled by four anchor points as shown in FIG. 7. $Y_p$ in the above equation may be the Y value of the pixel p.

Figure 8:
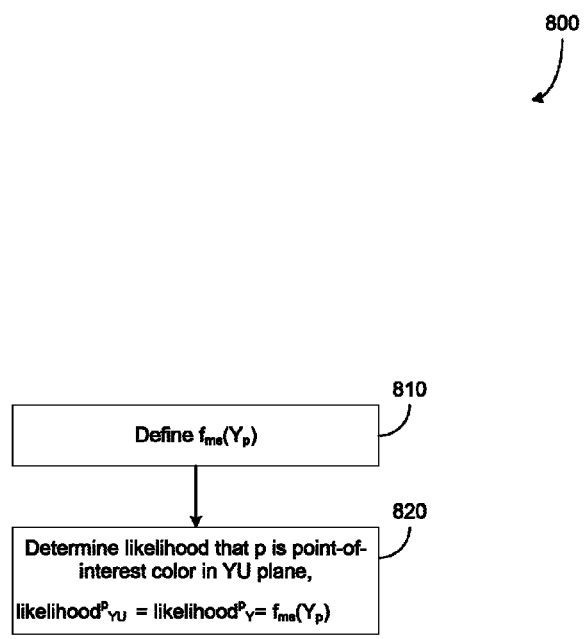
FIG. 8 is a flowchart illustrating the process of determining the likelihood that the color of a pixel is a point-of-interest color in the YU plane, according to an embodiment.
Figure 9:
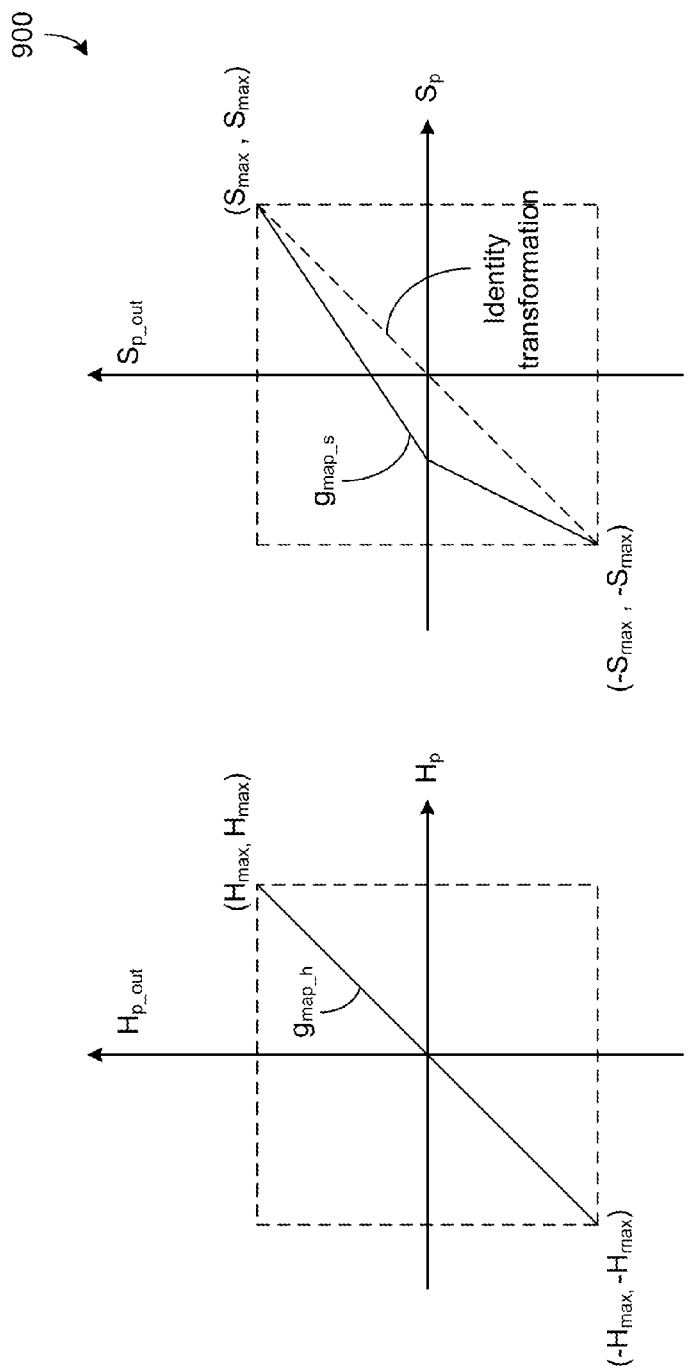
FIG. 9 illustrates examples of functions that may be constrained for purposes of adjustment of saturation, hue, or for color compression, according to an embodiment.

A process for determining the likelihood of the pixel p in the YU plane, as approximated by a projection on the Y axis, is illustrated in FIG. 8, according to an embodiment. At 810, the function $f_{ms}$ may be defined. At 820, the likelihood that pixel p is the point-of-interest color in the YU plane may be approximated by the likelihood that $Y_p$ has the appropriate value along the Y axis, $\text{likelihood}^p_{YU} = \text{likelihood}^p_Y = f_{ms}(Y_p)$.

The likelihood that the input pixel p is a pixel with the point-of-interest color may then be determined by $$\text{likelihood}^p = \min(\text{likelihood}_{UV}, \text{likelihood}_{YV}, \text{likelihood}_Y) \quad (9)$$

As an example, a skin tone detection module may be set to have $(U_c, V_c) = (110, 154)$ for 8-bit input data, where $\theta_c$ may be approximately 128°, and $(d_S, d_H) = (0, 0)$. Such a module may have similar longitude settings for the rectangle and diamond shape to approximate an eclipse-like ST projection on the UV plane. In an embodiment, $(U_c, V_c)$ may be considered to be the skin tone with the greatest confidence level, and may reflect the exact target color in the above point-of-interest color detector.

To map $\theta_c$ in the above point-of-interest color detector, the angle $\theta_c$ may be decomposed into a hue angle of the exact point-of-interest color c (i.e., $\theta_{hc}$) and a hue angle offset (i.e., $\theta_{offset}$):

$$\theta_c = \theta_{hc} + \theta_{offset} \quad (10)$$

where $$\theta_{hc} = \begin{cases} \tan^{-1}[((V_{c\_8bit} - 128)/224)/ & \text{for all } U_{c\_8bit} > 128 \ \& \\ \quad((U_{c\_8bit} - 128)/224)], & V_{c\_8bit} > 128 \\ 180° + \tan^{-1}[((V_{c\_8bit} - 128)/224)/ & \text{for all } U_{c\_8bit} < 128 \\ \quad((U_{c\_8bit} - 128)/224)], & \\ 360° + \tan^{-1}[((V_{c\_8bit} - 128)/224)/ & \text{for all } U_{c\_8bit} > 128 \ \& \\ \quad((U_{c\_8bit} - 128)/224)], & V_{c\_8bit} < 128 \\ 0, & \text{otherwise} \end{cases} \quad (11)$$

When the dissimilarity between an input pixel p and the exact color point c in hue and saturation is considered equal in both positive and negative directions in the calculation of likelihood, this may result in a horizontally or vertically (or both) symmetric projection shape aligned with the direction of c. A non-zero $\theta_{offset}$ (approximately 3°) and a color detection module may detect a tilted ST projected UV distribution which implies the non-equal treatment for the directional hue change from the skin color center. In other words, $\theta_{offset}$ may be viewed as a parameter granting the freedom of the orientation of the distribution of any color cluster.

The value likelihood$^p$ may have several uses. As noted above, this value may be used to detect a point-of-interest color. It may also be used for purposes of color adjustment, such as manipulation of saturation and hue. This value may also be used for color compression.

Figure 10:
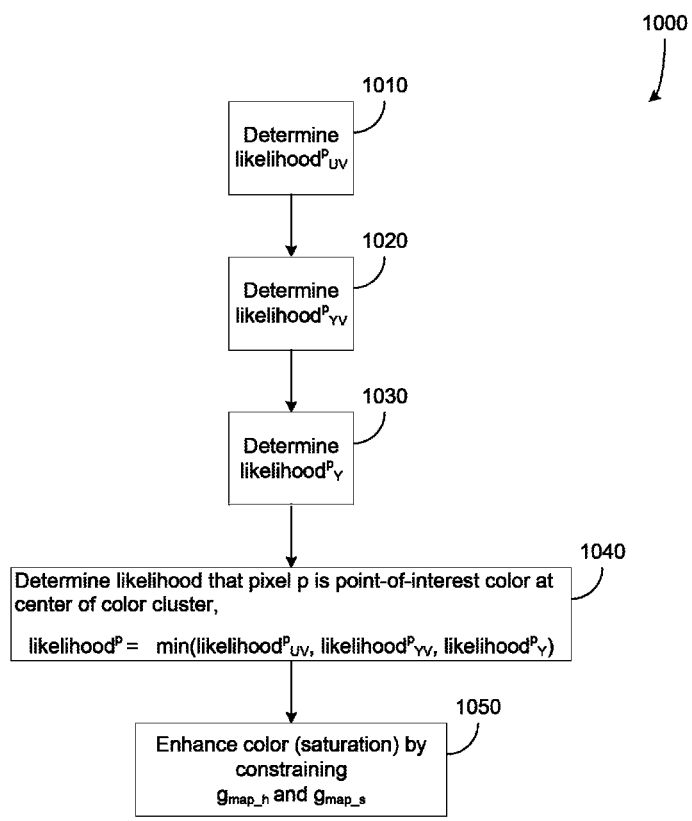
FIG. 10 is a flowchart illustrating the process of adjusting the saturation of a pixel, according to an embodiment.

To accomplish this, two PWLFs may be defined, and denoted $g_{map\_h}$ and $g_{map\_s}$; an input pixel p may be adjusted in the HS plane according to its likelihood to the target color:

$$H_{p\_out} = \tag{12}$$
$$\begin{cases} H_p + \Delta H_p \times \text{likelihood}^p, & |H_p| \le H_{max}, \Delta H_p = [g_{map\_h}(H_p) - H_p] \\ H_p, & \text{otherwise} \end{cases}$$

$$S_{p\_out} =$$
$$\begin{cases} S_p + \Delta S_p \times \text{likelihood}^p, & |S_p| \le S_{max}, \Delta S_p = [g_{map\_s}(S_p) - S_p] \\ S_p, & \text{otherwise} \end{cases}$$

where $g_{map\_h}$: H→H and $g_{map\_s}$: S→S. Examples of these functions are shown in FIG. 10, according to an embodiment. The pixel may be transformed from the HS domain back into the UV domain. If $\theta_{offset}$ is set to zero for point-of-interest color detection, adjustment of saturation of a color pixel while keeping its hue close to the original value may be provided by setting $g_{map\_h}$ and $g_{map\_s}$ with the following constraints:

$$\begin{cases} g_{map\_h}(H_p) \ge H_p, & \text{for all } 0 \le H_p \le H'_+, H'_+ < H_{max} \\ g_{map\_h}(H_p) \le H_p, & \text{for all } (-H'_-) \le H_p \le 0, H'_- < H_{max} \\ g_{map\_s}(S_p) \ge S_p, & \text{for all } |S_p| \le S_{max} \end{cases} \tag{13}$$

Since $g_{map\_h}$ and $g_{map\_s}$ have been confined with $g_{map\_h}$ ($\pm H_{max}$)=$\pm H_{max}$ and $g_{map\_s}$($\pm S_{max}$)=$\pm S_{max}$, the effective range of saturation enhancement may be specified by (H'_-, H'_+, S_{max}) in eq. (13).

The functionality of de-saturation may be achieved by applying the following constraints to $g_{map\_h}$ and $g_{map\_s}$:

$$\begin{cases} g_{map\_h}(H_p) \le H_p, & \text{for all } 0 \le H_p \le H_{max} \\ g_{map\_h}(H_p) \ge H_p, & \text{for all } (-H_{max}) \le H_p \le 0 \\ g_{map\_s}(S_p) \le S_p, & \text{for all } |S_p| \le S_{max} \end{cases} \tag{14}$$

The processing for saturation adjustment is illustrated in FIG. 10, according to an embodiment. At 1010, the likelihood that an input pixel p is the point-of-interest color in the UV plane, ($U_c$, $V_c$), may be determined. This probability is shown as likelihood$^p_{UV}$. At 1020, the likelihood that an input pixel p is the point-of-interest color ($Y_c$, $V_c$) in the YV plane may be determined. This probability is shown as likelihood$^p_{YV}$. At 1030, the likelihood that an input pixel p is the point-of-interest color ($Y_c$, $U_c$) in the YU plane may be determined. This probability may be simplified to be a one-dimensional projection over the Y-axis in the illustrated embodiment. This probability is shown as likelihood$^p_Y$. At 1040, the likelihood that the pixel p is the point-of-interest color at the center of the color cluster may be determined. This probability is shown as likelihood$^p$. At 1050, color saturation at p may be adjusted by constraining the functions $g_{map\_h}$ and $g_{map\_s}$.

Color correction for hue may also be performed. In an embodiment, this may be achieved by setting $g_{map\_h}$ and $g_{map\_s}$ with the following constraints:

$$\begin{cases} g_{map\_h}(H_p) \le H_p, & \text{for all } 0 \le H_p \le H'_+, H'_+ < H_{max} \\ g_{map\_h}(H_p) \ge H_p, & \text{for all } (-H'_-) \le H_p \le 0, H'_- < H_{max} \\ g_{map\_s}(S_p) \ge S_p, & \text{for all } |S_p| \le S_{max} \end{cases} \tag{15}$$

Figure 11:
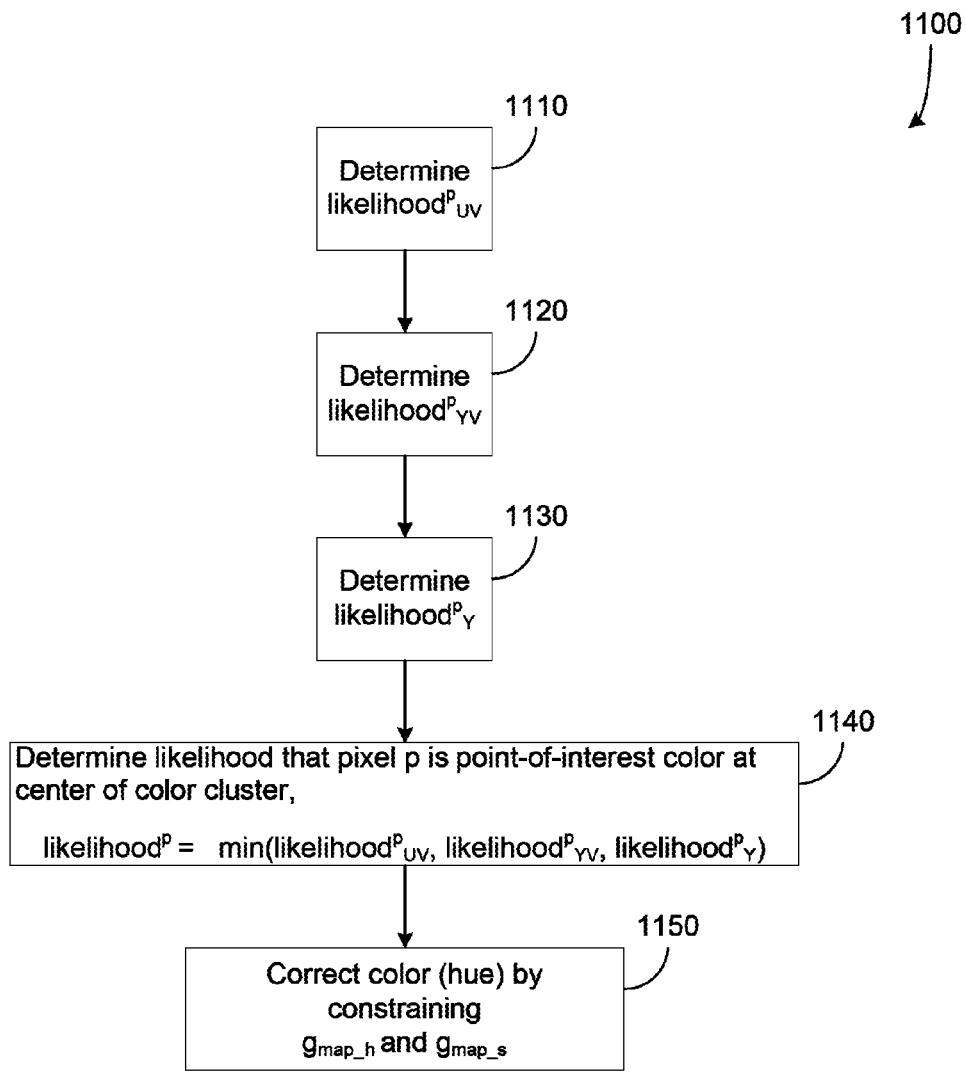
FIG. 11 is a flowchart illustrating the process of adjusting the hue of a pixel, according to an embodiment.

The processing for hue adjustment is illustrated in FIG. 11, according to an embodiment. At 1110, the likelihood that an input pixel p is the point-of-interest color ($U_c$, $V_c$) in the UV plane may be determined. This probability is shown as likelihood$^p_{UV}$. At 1120, the likelihood that an input pixel p is the point-of-interest color ($Y_c$, $V_c$) in the YV plane may be determined. This probability is shown as likelihood$^p_{YV}$. At 1130, the likelihood that an input pixel p is the point-of-interest color ($Y_c$, $U_c$) in the YU plane may be determined. This probability may simplified to be a one-dimensional projection over the Y-axis in the illustrated embodiment. This probability is shown as likelihood$^p_Y$. At 1140, the likelihood that the pixel p is the point-of-interest color at the center of the color cluster may be determined. This probability is shown as likelihood$^p$. At 1150, hue at p may be adjusted by constraining the functions $g_{map\_h}$ and $g_{map\_s}$ as shown above in eq. 15.

Moreover, the functions $g_{map\_h}$ and $g_{map\_s}$ may be constrained for purposes of color compression (i.e., moving a pixel in a local neighborhood towards the central color) by establishing flat central intervals, as follows:

$$\begin{cases} g_{map\_h}(H_p) \le H_p, & \text{for all } 0 \le H_p \le H'_+, H'_+ < H_{max} \\ g_{map\_h}(H_p) \ge H_p, & \text{for all } (-H'_-) \le H_p \le 0, H'_- < H_{max} \\ g_{map\_s}(S_p) \le S_p, & \text{for all } 0 \le S_p \le S'_+, S'_+ < S_{max} \\ g_{map\_s}(S_p) \ge S_p, & \text{for all } (-S'_-) \le S_p \le 0, S'_- < S_{max}. \end{cases} \tag{16}$$

Here the values $S'_-$ and $S'_+$ are user controllable parameters specifying the range covered for color compression.

Figure 12:
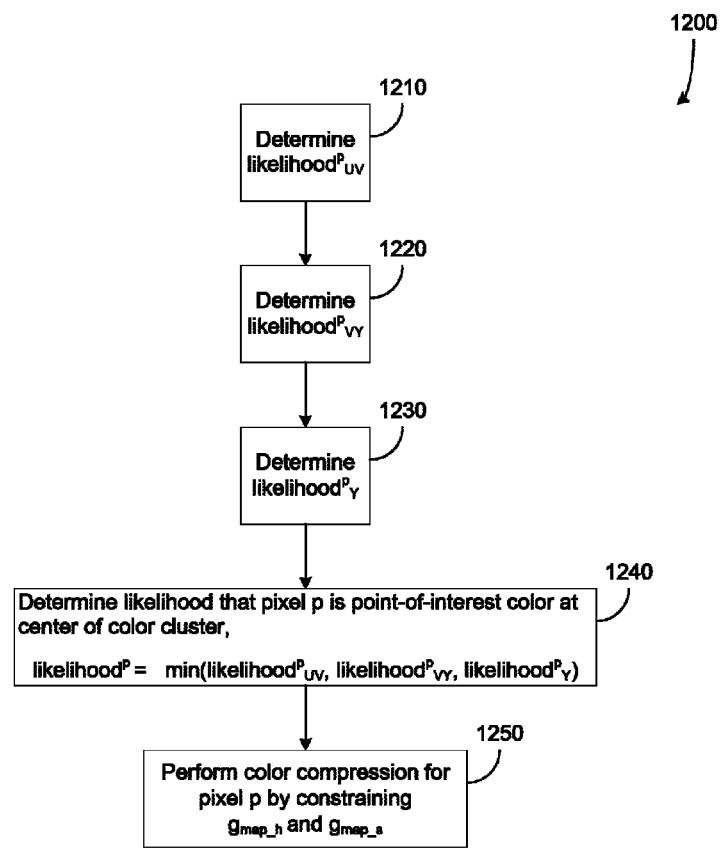
FIG. 12 is a flowchart illustrating the process of performing color compression for a pixel, according to an embodiment.

The processing for color compression is illustrated in FIG. 12, according to an embodiment. At 1210, the likelihood that an input pixel p is the point-of-interest color ($U_c$, $V_c$) in the UV plane may be determined. This probability is shown as likelihood$^p{}_{UV}$. At 1220, the likelihood that an input pixel p is the point-of-interest color (Y$_c$, V$_c$) in the YV plane may be determined. This probability is shown as likelihood$^p{}_{YV}$. At 1230, the likelihood that an input pixel p is the point-of-interest color (Y$_c$, U$_c$) in the YU plane may be determined. This probability may be simplified to be a one-dimensional projection over the Y-axis in the illustrated embodiment. This probability is shown as likelihood$^p{}_Y$. At 1240, the likelihood that the pixel p is the point-of-interest color at the center of the color cluster may be determined. This probability is shown as likelihood$^p$. At 1250, color compression for p may be performed by constraining the functions g$_{map\_h}$ and g$_{map\_s}$ according to eq. 16 above.

Figure 13:
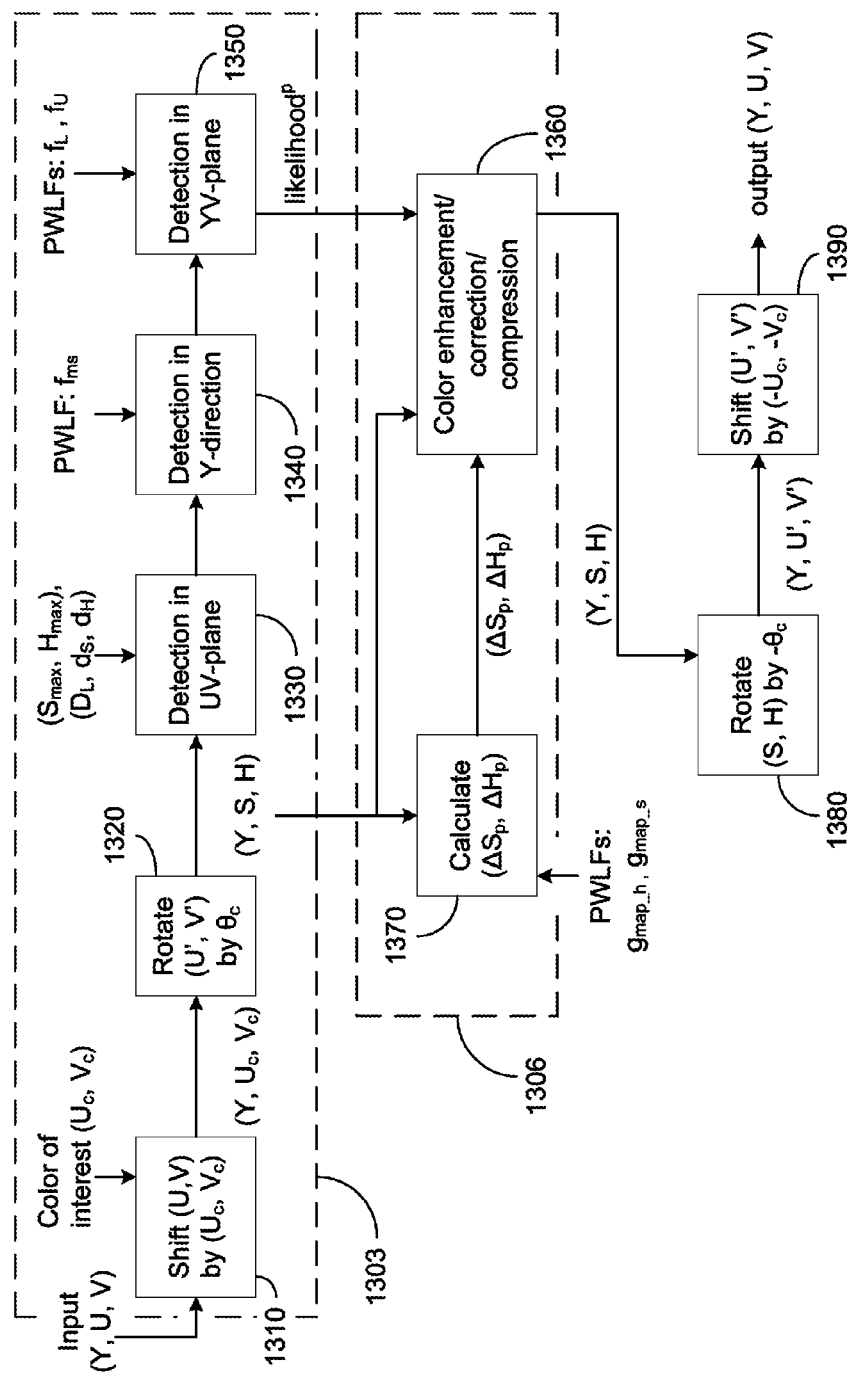
FIG. 13 is a block diagram illustrating the structural modules of an implementation of an embodiment of the invention.

The processing described above may be implemented using structural modules as illustrated in FIG. 13, according to an embodiment. Module 1303 may represent a point-of-interest color detector, and module 1306 may represent a module that performs color enhancement, correction, and/or compression. Within module 1303, a module 1310 may receive an input pixel p, where the color of p is specified in Y, U, V coordinates. Module 1310 may also receive a definition of a color of interest, (U$_c$, V$_c$). Module 1310 may perform a shift of (U, V), resulting in coordinates (Y, U$_c$, V$_c$). At module 1320, corresponding coordinates (Y, S, H) may be produced, according to the processing described above with respect to eq. 1.

Module 1330 may receive the coordinates (Y, S, H) and determine the likelihood that the pixel p is located at a specified location in the YV plane. To accomplish this, module 1330 uses the values (S$_{max}$, H$_{max}$) and (D$_L$, d$_S$, d$_H$). At module 1340, the likelihood that p is located at a location on the Y axis may be determined, using the function f$_{ms}$. At module 1350, the likelihood that p is located at a location in the YV plane may be determined, using PWLFs f$_L$ and f$_U$. Note that in the embodiment of FIG. 13, the likelihood of the pixel in the UV plane may be determined, followed by the determination with respect to the Y axis, followed by the determination with respect to the YV plane. This sequence is not meant to be limiting; in an alternative embodiment, the sequence of these operations may differ.

The resulting likelihood$^p$ may then be generated and sent to a module 1360, where the saturation (or de-saturation) or hue may be adjusted, and/or where color compression may be performed. In the illustrated embodiment, the operation of module 1360 uses the values ΔS$_p$ and ΔH$_p$. These latter values may be generated at module 1370, using PWLFs g$_{map\_h}$ and g$_{map\_s}$ as described above with respect to eq. 12.

The new coordinates that result from the operation of module 1360 may then be passed to module 1380. Here, the rotation of module 1320 may be undone. At module 1390, a shift of the U and V coordinates may be performed, to account for the shift performed at module 1310. This may result in a final output as shown in the embodiment of FIG. 13.

One or more features disclosed herein, including the modules shown in FIG. 13, may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Figure 14:
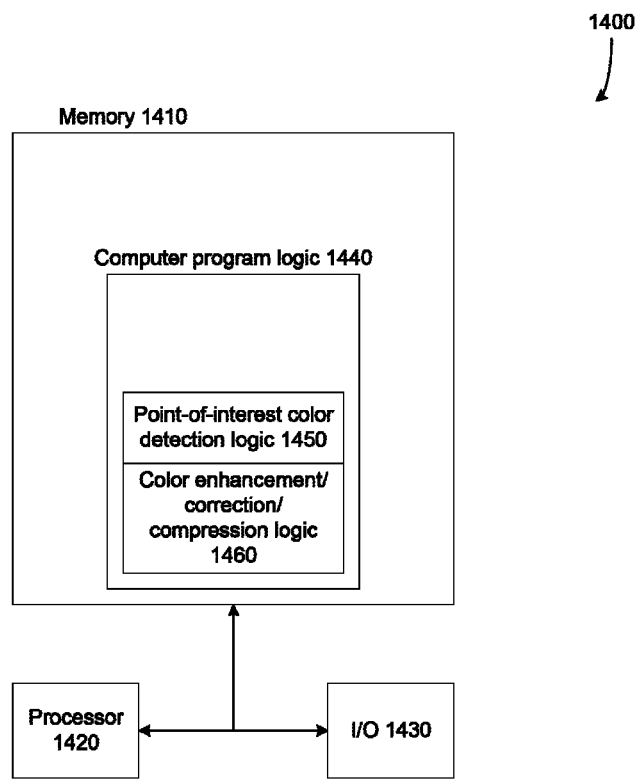
FIG. 14 is a block diagram illustrating the structural modules of a software or firmware implementation of an embodiment of the invention.

A software or firmware embodiment of the processing described above is illustrated in FIG. 14. System 1400 may include a programmable processor 1420 and a body of memory 1410 that may include one or more computer readable media that store computer program logic 1440. Memory 1410 may be implemented as one or more of a hard disk and drive, a removable media such as a compact disk and drive, flash memory, or a random access (RAM) or read-only memory (ROM) device, for example. Processor 1420 and memory 1410 may be in communication using any of several technologies known to one of ordinary skill in the art, such as a bus. Processor 1420 may be a special purpose graphics processor or a general purpose processor being used as a graphics processor. Logic, contained in memory 1410 may be read and executed by processor 1420. One or more I/O ports and/or I/O devices, shown collectively as I/O 1430, may also be connected to processor 1420 and memory 1410.

In an embodiment, computer program logic 1440 may include the logic modules 1450 and 1460. Point-of-interest color detection logic 1450 may be responsible for the processing described above with respect to reference 1303 of FIG. 13, as well as FIGS. 2, 4, 6 and 8. Color enhancement/correction/compression logic module 1460 may be responsible for the processing described above with respect to reference 1306 of FIG. 13, as well as FIGS. 10-11.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method, comprising:
   in a graphics processor, determining a likelihood (likelihood$^p{}_{UV}$) that a pixel p is an arbitrary point-of-interest color in a UV plane;
   determining a likelihood (likelihood$^p{}_{YV}$) that pixel p is the point-of-interest color in a YV plane;
   determining a likelihood (likelihood$^p{}_Y$) that pixel p is the point-of-interest color along a Y axis; and
   determining a likelihood (likelihood$^p$) that pixel p is the point-of-interest color at the center of a color cluster, likelihood$^p$=min(likelihood$^p{}_{UV}$, likelihood$^p{}_{YV}$, likelihood$^p{}_Y$),
   wherein said determining of likelihood$^p{}_Y$ comprises determining likelihood Y=f$_{ms}$(Y$_p$),
   where f$_{ms}$ is a four segment PWLF, f$_{ms}$: Y→ms, ms∈[1,0] and Y$_p$ is the Y value of the pixel p.

2. The method of claim 1, wherein said determining of likelihood$^p{}_{UV}$ comprises:
   projecting the color cluster on the UV plane;
   approximating the projection in an hue-saturation (HS) plane;
   determining a likelihood R$_{factor}$ that the pixel p is the point-of-interest color from a rectangular projection in the HS plane, where $$R_{factor} = \begin{cases} \min[(H_{max} - |H_p|)/2^{|B_{margin}-5|}, \\ (S_{max} - |S_p|)/2^{|B_{margin}-5|}], & \text{for all } |H_p| < H_{max} \;\&\; |S_p| < S_{max} \\ 0, & \text{otherwise} \end{cases}$$

where $H_p$ and $S_p$ are color coordinates of the pixel p as projected in the HS plane, and $H_{max}$, $S_{max}$, and $B_{margin}$ are parameters specifying a range of the rectangular projection of the color cluster in the HS plane;

determining a likelihood $D_{factor}$ that the pixel p is the point-of-interest color from a diamond shaped projection in the HS plane, where $$D_{factor} = \begin{cases} 1, & \text{for all } dist < (D_L - D_{margin}) \\ (D_L - D_{margin})/2^{|B_{D\_margin}-5|}, & \text{for all } (D_L - D_{margin}) \leq dist < D_L \\ 0, & \text{otherwise} \end{cases}$$

$$dist = \left[|S_p - d_S| + \frac{1}{\tan\beta}|H_p - d_H|\right]$$

where $D_L$, $D_{margin}$, $B_{D\_margin}$, $d_H$, $d_S$ and $\beta$ are parameters specifying a range of the diamond-shaped projection of the color cluster in the HS plane; and determining likelihood$^P_{UV}$ = min($R_{factor}$, $D_{factor}$).

3. The method of claim 1, wherein said determining of likelihood$^P_{YV}$ comprises:

determining $$\det_L = \begin{cases} 1, & \forall\; V_p > [f_L(Y_p) + M_{VY\_L}] \\ [V_P - f_L(Y_p)]/M_{VY\_L}, & \forall\; f_L(Y_p) \leq V_P \leq [f_L(Y_p) + M_{VY\_L}], \text{ and} \\ 0, & \text{otherwise} \end{cases}$$

where $f_L$ is a three-segment piecewise linear function (PWLF) in the YV plane and having four anchor points, $f_L: Y \to V$, $Y_p$ and $V_p$ represent the YV coordinates of the pixel p in the YV plane, and $M_{YV\_L}$ is a parameter specifying a first confidence margin in the YV plane;

determining $$\det_U = \begin{cases} 1, & \forall\; V_p < [f_U(Y_p) - M_{VY\_U}] \\ [f_U(Y_p) - V_p]/M_{VY\_U}, & \forall\; [f_U(Y_p) - M_{VY\_U}] \leq V_p \leq f_U(Y_p) \\ 0, & \text{otherwise} \end{cases}$$

where $f_U$ is another three-segment PWLF in the YV plane and having four anchor points, $f_U: Y \to V$, and $M_{YV\_U}$ is a parameter specifying a second confidence margin in the YV plane; and determining likelihood$^P_{YV}$ = min(det$_L$, det$_U$).

4. The method of claim 1, further comprising:
adjusting the saturation of the pixel p by constraining a piece-wise linear function (PWLF) $g_{map\_s}$ according to $$g_{map\_s}(S_p) \geq S_p, \forall |S_p| \leq S_{max}$$

where $S_p$ is the coordinate of the pixel p on an S axis and $S_{max}$ is a parameter defining a maximum value for S in a projection of the color cluster in a hue-saturation (HS) plane; and determining an adjusted saturation $$S_{p\_out} = \begin{cases} S_p + \Delta S_p \times \text{likelihood}^p, & |S_p| \leq S_{max} \\ S_p, & \text{otherwise} \end{cases},$$

$$\Delta S_p = [g_{map\_s}(S_p) - S_p].$$

5. The method of claim 1, further comprising:
de-saturating the color of the pixel p by constraining a piece-wise linear function (PWLF) $g_{map\_s}$ according to $$g_{map\_s}(S_p) \leq S_p, \forall |S_p| \leq S_{max}$$

where $S_p$ is the coordinate of the pixel p on an S axis and $S_{max}$ is a parameter defining a maximum value for S in a projection of the color cluster in a hue-saturation (HS) plane; and determining an adjusted saturation $$S_{p\_out} = \begin{cases} S_p + \Delta S_p \times \text{likelihood}^p, & |S_p| \leq S_{max} \\ S_p, & \text{otherwise} \end{cases},$$

$$\Delta S_p = [g_{map\_s}(S_p) - S_p].$$

6. The method of claim 1, further comprising:
correcting the color of the pixel p by constraining a piece-wise linear function (PWLF) $g_{map\_h}$ according to $$g_{map\_h}(H_p) \leq H_p, \forall 0 \leq H_p \leq H_+, H_+ < H_{max}$$

$$g_{map\_h}(H_p) \geq H_p, \forall (-H_-) \leq H_p \leq 0, H'_- < H_{max}$$

where $H_p$ is the coordinate of the pixel on an H axis, $H_{max}$ is a parameter defining a maximum value for H in a projection of the color cluster in a hue-saturation (HS) plane, and (H'$_-$, H'$_+$, S$_{max}$) define the effective range of saturation enhancement; and determining an adjusted hue $$H_{p\_out} = \begin{cases} H_p + \Delta H_p \times \text{likelihood}^p, & |H_p| \leq H_{max} \\ H_p, & \text{otherwise} \end{cases},$$

$$\Delta H_p = [g_{map\_h}(H_p) - H_p].$$

7. The method of claim 1, further comprising:
performing color compression by
constraining a piece-wise linear function (PWLF) $g_{map\_h}$ according to $$g_{map\_h}(H_p) \leq H_p, \forall 0 \leq H_p \leq H_+, H_+ < H_{max}$$

$$g_{map\_h}(H_p) \geq H_p, \forall (-H'_-) \leq H_p \leq 0, H'_- < H_{max}$$

where $H_p$ is the coordinate of the pixel on an H axis, $H_{max}$ is a parameter defining a maximum value for H in a projection of the color cluster in a hue-saturation (HS) plane, and (H'$_-$, H'$_+$, S$_{max}$) define the effective range of saturation enhancement;

constraining a PWLF $g_{map\_s}$ according to $$g_{map\_s}(S_p) \leq S_p, \forall 0 \leq S_p \leq S'_+, S'_+ < S_{max}$$

$$g_{map\_s}(S_p) \geq S_p, \forall (-S'_-) \leq S_p \leq 0, S'_- < S_{max}$$

where $S_p$ is the coordinate of the pixel on the S axis, $S_{max}$ is a parameter defining a maximum value for S in the projection of the color cluster in the HS plane, and $S'_-$ and $S'_+$ are user controllable parameters that specify the range covered for color compression;
determining an adjusted saturation, $$S_{p\_out} = \begin{cases} S_p + \Delta S_p \times \text{likelihood}^P, & |S_p| \leq S_{max} \\ S_p, & \text{otherwise} \end{cases},$$

$$\Delta S_p = [g_{map\_s}(S_p) - S_p]; \text{ and}$$

determining an adjusted hue, $$H_{p\_out} = \begin{cases} H_p + \Delta H_p \times \text{likelihood}^P, & |H_p| \leq H_{max} \\ H_p, & \text{otherwise} \end{cases},$$

$$\Delta H_p = [g_{map\_h}(H_p) - H_p].$$

8. A system, comprising:
a processor; and
a memory in communication with said processor, wherein said memory stores a plurality of processing instructions configured to direct said processor to
determine a likelihood (likelihood$^P_{UV}$) that a pixel p is an arbitrary point-of-interest color in a UV plane;
determine a likelihood (likelihood$^P_{YV}$) that pixel p is the point-of-interest color in a YV plane;
determine a likelihood (likelihood$^P_Y$) that pixel p is the point-of-interest color along a Y axis; and
determine a likelihood (likelihood$^P$) that pixel p is the point-of-interest color at the center of a color cluster, likelihood$^P$=min(likelihood$^P_{UV}$, likelihood$^P_{YV}$, likelihood$^P_Y$),
wherein said processing instructions configured to direct said processor to determine likelihood$^P_Y$ comprise processing instructions configured to direct said processor to determine likelihood $Y=f_{ms}(Y_p)$, where $f_{ms}$ is a four segment PWLF, $f_{ms}: Y \rightarrow ms$, $ms \in [1,0]$ and $Y_p$ is the Y value of the pixel p.

9. The system of claim 8, wherein said processing instructions configured to direct said processor to determine likelihood$^P_{UV}$ comprises processing instructions configured to direct said processor to:
project the color cluster on the UV plane;
approximate the projection in an hue-saturation (HS) plane;
determine a likelihood $R_{factor}$ that the pixel p is the point-of-interest color from a rectangular projection in the HS plane, where $$R_{factor} = \begin{cases} \min[(H_{max} - |H_p|)/2^{|B_{margin}-5|}, \\ \quad (S_{max} - |S_p|)/2^{|B_{margin}-5|}], & \forall |H_p| < H_{max} \,\&\, |S_p| < S_{max} \\ 0, & \text{otherwise} \end{cases}$$

where $H_p$ and $S_p$ are color coordinates of the pixel p as projected in the HS plane, and $H_{max}$, $S_{max}$, and $B_{margin}$ are parameters specifying a range of the rectangular projection of the color cluster in the HS plane;
determine a likelihood $D_{factor}$ that the pixel p is the point-of-interest color from a diamond shaped projection in the HS plane, where $$D_{factor} = \begin{cases} 1, & \forall \text{ dist} < (D_L - D_{margin}) \\ (D_L - D_{margin})/2^{|B_{D\_margin}-5|}, & \forall (D_L - D_{margin}) \leq \text{dist} < D_L \\ 0, & \text{otherwise} \end{cases},$$

$$\text{dist} = \left[|S_p - d_S| + \frac{1}{\tan\beta}|H_p - d_H|\right]$$

where $D_L$, $D_{margin}$, $B_{D\_margin}$, $d_H$, $d_S$ and $\beta$ are parameters specifying a range of the diamond-shaped projection of the color cluster in the HS plane; and
determine likelihood$^P_{UV}$=min($R_{factor}$, $D_{factor}$).

10. The system of claim 8, wherein said processing instructions configured to direct said processor to determine likelihood$^P_{YV}$ comprises processing instructions configured to direct said processor to:
determine $$\det_L = \begin{cases} 1, & \forall V_p > [f_L(Y_p) + M_{VY\_L}] \\ [V_p - f_L(Y_p)]/M_{VY\_L}, & \forall f_L(Y_p) \leq V_p \leq [f_L(Y_p) + M_{VY\_L}], \text{ and} \\ 0, & \text{otherwise} \end{cases}$$

where $f_L$ is a three-segment piecewise linear function (PWLF) in the YV plane and having four anchor points, $f_L: Y \rightarrow V$, $Y_p$ and $V_p$ represent the YV coordinates of the pixel p in the YV plane, and $M_{YV\_L}$ is a parameter specifying a first confidence margin in the YV plane;
determine $$\det_U = \begin{cases} 1, & \forall V_p < [f_U(Y_p) - M_{VY\_U}] \\ [f_U(Y_p) - V_p]/M_{VY\_U}, & \forall [f_U(Y_p) - M_{VY\_U}] \leq V_p \leq f_U(Y_p) \\ 0, & \text{otherwise} \end{cases}$$

where $f_U$ is another three-segment PWLF in the YV plane and having four anchor points, $f_U: Y \rightarrow V$, and $M_{YV\_U}$ is parameter specifying a second confidence margin in the YV plane; and
determine likelihood$^P_{YV}$=min($\det_L$, $\det_U$).

11. The system of claim 8, wherein said processing instructions further comprise processing instructions configured to direct said processor to:
adjust the saturation of the pixel p by constraining a piecewise linear function (PWLF) $g_{map\_s}$ according to $$g_{map\_s}(S_p) \geq S_p, \forall |S_p| \leq S_{max}$$

where $S_p$ is the coordinate of the pixel p on an S axis and $S_{max}$ is a parameter defining a maximum value for S in a projection of the color cluster in a hue-saturation (HS) plane; and
determining an adjusted saturation $$S_{p\_out} = \begin{cases} S_p + \Delta S_p \times \text{likelihood}^P, & |S_p| \leq S_{max} \\ S_p, & \text{otherwise} \end{cases},$$

$$\Delta S_p = [g_{map\_s}(S_p) - S_p].$$

12. The system of claim 8, wherein said processing instructions further comprise processing instructions configured to direct said processor to:

de-saturate the color of the pixel p by constraining a piece-wise linear function (PWLF) $g_{map\_s}$ according to $$g_{map\_s}(S_p) \leq S_p, \forall |S_p| \leq S_{max}$$

where $S_p$ is the coordinate of the pixel p on an S axis and $S_{max}$ is a parameter defining a maximum value for S in the projection of the color cluster in a hue-saturation (HS) plane; and determining an adjusted saturation $$S_{p\_out} = \begin{cases} S_p + \Delta S_p \times \text{likelihood}^p, & |S_p| \leq S_{max} \\ S_p, & \text{otherwise} \end{cases},$$

$$\Delta S_p = [g_{map\_s}(S_p) - S_p].$$

13. The system of claim 8, wherein said processing instructions further comprise processing instructions configured to direct said processor to:

correct the color of the pixel p by constraining a piece-wise linear function (PWLF) $g_{map\_h}$ according to $$g_{map\_h}(H_p) \leq H_p, \forall 0 \leq H_p \leq H'_+, H'_+ < H_{max}$$

$$g_{map\_h}(H_p) \geq H_p, \forall (-H'_-) \leq H_p \leq 0, H'_- < H_{max}$$

where $H_p$ is the coordinate of the pixel on an H axis, $H_{max}$ is a parameter defining a maximum value for H in a projection of the color cluster in a hue-saturation (HS) plane, and (H'_-, H'_+, $S_{max}$) define the effective range of saturation enhancement; and determine an adjusted hue $$H_{p\_out} = \begin{cases} H_p + \Delta H_p \times \text{likelihood}^p, & |H_p| \leq H_{max} \\ H_p, & \text{otherwise} \end{cases},$$

$$\Delta H_p = [g_{map\_h}(H_p) - H_p].$$

14. The system of claim 8, wherein said processing instructions further comprise processing instructions configured to direct said processor to:

perform color compression by
constraining a piece-wise linear function (PWLF) $g_{map\_h}$ according to $$g_{map\_h}(H_p) \leq H_p, \forall 0 \leq H_p \leq H'_+, H'_+ < H_{max}$$

$$g_{map\_h}(H_p) \geq H_p, \forall (-H'_-) \leq H_p \leq 0, H'_- < H_{max}$$

where $H_p$ is the coordinate of the pixel on an H axis, $H_{max}$ is a parameter defining a maximum value for H in a projection of the color cluster in a hue-saturation (HS) plane, and (H'_-, H'_+, $S_{max}$) define the effective range of saturation enhancement;
constraining a PWLF $g_{map\_s}$ according to $$g_{map\_s}(S_p) \leq S_p, \forall 0 \leq S_p \leq S'_+, S'_+ < S_{max}$$

$$g_{map\_s}(S_p) \geq S_p, \forall (-S'_-) \leq S_p \leq 0, S'_- < S_{max}$$

where $S_p$ is the coordinate of the pixel on the S axis, $S_{max}$ is a parameter defining a maximum value for S in the projection of the color cluster in the HS plane, and S'_- and S'_+ are user controllable parameters that specify the range covered for color compression;

determining an adjusted saturation, $$S_{p\_out} = \begin{cases} S_p + \Delta S_p \times \text{likelihood}^p, & |S_p| \leq S_{max} \\ S_p, & \text{otherwise} \end{cases},$$

$$\Delta S_p = [g_{map\_s}(S_p) - S_p]; \text{ and}$$

determining an adjusted hue, $$H_{p\_out} = \begin{cases} H_p + \Delta H_p \times \text{likelihood}^p, & |H_p| \leq H_{max} \\ H_p, & \text{otherwise} \end{cases},$$

$$\Delta H_p = [g_{map\_h}(H_p) - H_p].$$

15. A computer program product including a non-transitory computer readable medium having computer program logic stored therein, the computer program logic including:

logic to cause a processor to determine a likelihood (likelihood$^p_{UV}$) that a pixel p is an arbitrary point-of-interest color in a UV plane;

logic to cause the processor to determine a likelihood (likelihood$^p_{YV}$) that pixel p is the point-of-interest color in a YV plane;

logic to cause the processor to determine a likelihood (likelihood$^p_{Y}$) that pixel p is the point-of-interest color along a Y axis; and logic to cause the processor to determine a likelihood (likelihood$^p$) that pixel p is the point-of-interest color at the center of a color cluster, likelihood$^p$=min(likelihood$^p_{UV}$, likelihood$^p_{YV}$, likelihood$^p_Y$), wherein said logic to cause the processor to determine the likelihood$^p_Y$ comprises logic to cause the processor to determine likelihood Y=$f_{ms}(Y_p)$, where $f_{ms}$ is a four segment PWLF, $f_{ms}$:Y→ms, ms∈[1,0] and $Y_p$ is the Y value of the pixel p.

16. The computer program product of claim 15, wherein said logic to cause the processor to determine the likelihood$^p_{UV}$ comprises:

logic to cause the processor to project the color cluster on the UV plane;

logic to cause the processor to approximate the projection in an hue-saturation (HS) plane;

logic to cause the processor to determine a likelihood $R_{factor}$ that the pixel p is the point-of-interest color from a rectangular projection in the HS plane, where $$R_{factor} = \begin{cases} \min[(H_{max} - |H_p|)/2^{|B_{margin}-5|}, \\ \quad (S_{max} - |S_p|)/2^{|B_{margin}-5|}], & \forall |H_p| < H_{max} \& |S_p| < S_{max} \\ 0, & \text{otherwise} \end{cases}$$

where $H_p$ and $S_p$ are color coordinates of the pixel p as projected in the HS plane, and $H_{max}$, $S_{max}$, and $B_{margin}$ are parameters specifying a range of the rectangular projection of the color cluster in the HS plane;

logic to cause the processor to determine a likelihood $D_{factor}$ that the pixel p is the point-of-interest color from a diamond shaped projection in the HS plane, where $$D_{factor} = \begin{cases} 1, & \forall\ dist < (D_L - D_{margin}) \\ (D_L - D_{margin})/2^{|B_{D\_margin}-5|}, & \forall\ (D_L - D_{margin}) \leq dist < D_L \\ 0, & \text{otherwise} \end{cases}$$

$$dist = \left[|S_p - d_S| + \frac{1}{\tan\beta}|H_p - d_H|\right]$$

where $D_L$, $D_{margin}$, $B_{D\_margin}$, $d_H$, $d_S$ and $\beta$ are parameters specifying a range of the diamond-shaped projection of the color cluster in the HS plane; and logic to cause the processor to determine likelihood$^p{}_{UV}$=min ($R_{factor}$, $D_{factor}$).

17. The computer program product of claim 15, wherein said logic to cause the processor to determine the likelihood$^p{}_{YV}$ comprises:

logic to cause the processor to determine $$det_L = \begin{cases} 1, & \forall\ V_p > [f_L(Y_p) + M_{VY\_L}] \\ [V_P - f_L(Y_p)]/M_{VY\_L}, & \forall\ f_L(Y_p) \leq V_P \leq [f_L(Y_p) + M_{VY\_L}], \text{ and} \\ 0, & \text{otherwise} \end{cases}$$

where $f_L$ is a three-segment piecewise linear function (PWLF) in the YV plane and having four anchor points, $f_L$:Y→V, $Y_p$ and $V_p$ represent the YV coordinates of the pixel p in the YV plane, and $M_{YV\_L}$ is a parameter specifying a first confidence margin in the YV plane;

logic to cause the processor to determine $$det_U = \begin{cases} 1, & \forall\ V_p < [f_U(Y_p) - M_{VY\_U}] \\ [f_U(Y_p) - V_p]/M_{VY\_U}, & \forall\ [f_U(Y_p) - M_{VY\_U}] \leq V_p \leq f_U(Y_p) \\ 0, & \text{otherwise} \end{cases}$$

where $f_U$ is another three-segment PWLF in the YV plane and having four anchor points, $f_U$:Y→V, and $M_{YV\_U}$ is a parameter specifying a second confidence margin in the YV plane; and logic to cause the processor to determine likelihood$^p{}_{YV}$=min($det_L$, $det_U$).

18. The computer program product of claim 15, further comprising:

logic to cause the processor to adjust the saturation of the pixel p by constraining a piece-wise linear function (PWLF) $g_{map\_s}$ according to $$g_{map\_s}(S_p) \geq S_p, \forall |S_p| \leq S_{max}$$

where $S_p$ is the coordinate of the pixel p on an S axis and $S_{max}$ is a parameter defining a maximum value for S in a projection of the color cluster in a hue-saturation (HS) plane; and logic to cause the processor to determine an adjusted saturation $$S_{p\_out} = \begin{cases} S_p + \Delta S_p \times \text{likelihood}^p, & |S_p| \leq S_{max} \\ S_p, & \text{otherwise} \end{cases},$$

$$\Delta S_p = [g_{map\_s}(S_p) - S_p].$$

19. The computer program product of claim 15, further comprising:

logic to cause the processor to de-saturate the color of the pixel p by constraining a piece-wise linear function (PWLF) $g_{map\_s}$ according to $$g_{map\_s}(S_p) \leq S_p, \forall |S_p| \leq S_{max}$$

where $S_p$ is the coordinate of the pixel p on an S axis and $S_{max}$ is a parameter defining a maximum value for S in a projection of the color cluster in a hue-saturation (HS) plane; and logic to cause the processor to determining an adjusted saturation $$S_{p\_out} = \begin{cases} S_p + \Delta S_p \times \text{likelihood}^p, & |S_p| \leq S_{max} \\ S_p, & \text{otherwise} \end{cases},$$

$$\Delta S_p = [g_{map\_s}(S_p) - S_p].$$

20. The computer program product of claim 15, further comprising:

logic to cause the processor to correct the color of the pixel p by constraining a piece-wise linear function (PWLF) $g_{map\_h}$ according to $$g_{map\_h}(H_p) \leq H_p, \forall 0 \leq H_p \leq H'_+, H'_+ < H_{max}$$

$$g_{map\_h}(H_p) \geq H_p, \forall (-H'_-) \leq H_p \leq 0, H'_- < H_{max}$$

where $H_p$ is the coordinate of the pixel on an H axis, $H_{max}$ is a parameter defining a maximum value for H in a projection of the color cluster in a hue-saturation (HS) plane, and ($H'_-$, $H'_+$, $S_{max}$) define the effective range of saturation enhancement; and logic to cause the processor to determine an adjusted hue $$H_{p\_out} = \begin{cases} H_p + \Delta H_p \times \text{likelihood}^p, & |H_p| \leq H_{max} \\ H_p, & \text{otherwise} \end{cases},$$

$$\Delta H_p = [g_{map\_h}(H_p) - H_p].$$

21. The computer program product of claim 15, further comprising:

logic to cause the processor to perform color compression by constraining a piece-wise linear function (PWLF) $g_{map\_h}$ according to $$g_{map\_h}(H_p) \leq H_p, \forall 0 \leq H_p \leq H'_+, H'_+ < H_{max}$$

$$g_{map\_h}(H_p) \geq H_p, \forall (-H'_-) \leq H_p \leq 0, H'_- < H_{max}$$

where $H_p$ is the coordinate of the pixel on an H axis, $H_{max}$ is a parameter defining a maximum value for H in a projection of the color cluster in a hue-saturation (HS) plane, and ($H'_-$, $H'_+$, $S_{max}$) define the effective range of saturation enhancement;

constraining a PWLF $g_{map\_s}$ according to $$g_{map\_s}(S_p) \leq S_p, \forall 0 \leq S_p \leq S'_+, S'_+ < S_{max}$$

$$g_{map\_s}(S_p) \geq S_p, \forall (-S'_-) \leq S_p \leq 0, S'_- < S_{max}$$

where $S_p$ is the coordinate of the pixel on the S axis, $S_{max}$ is a parameter defining a maximum value for S in the projection of the color cluster in the HS plane, and $S'_-$ and $S'_+$ are user controllable parameters that specify the range covered for color compression;

determining an adjusted saturation, $$S_{p\_out} = \begin{cases} S_p + \Delta S_p \times \text{likelihood}^p, & |S_p| \leq S_{max} \\ S_p, & \text{otherwise} \end{cases},$$

$$\Delta S_p = [g_{map\_s}(S_p) - S_p]; \text{ and}$$

determining an adjusted hue, $$H_{p\_out} = \begin{cases} H_p + \Delta H_p \times \text{likelihood}^p, & |H_p| \leq H_{max} \\ H_p, & \text{otherwise} \end{cases},$$

$$\Delta H_p = [g_{map\_h}(H_p) - H_p].$$

* * * * *